Aug. 14, 1934.  C. W. HULL  1,970,172
BOOSTER
Filed June 26, 1933
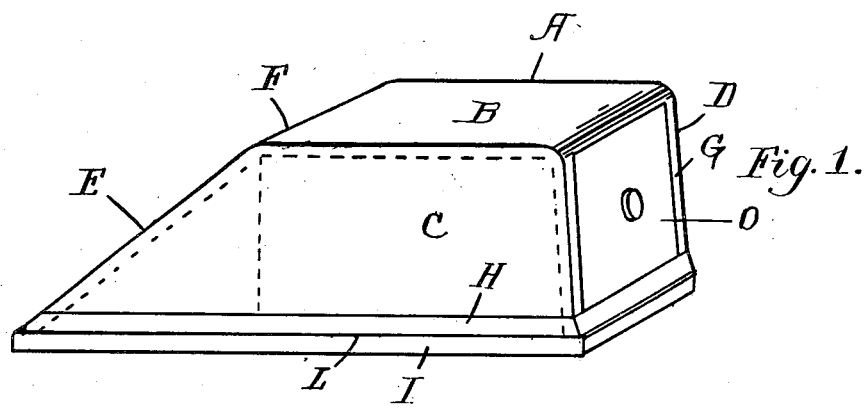
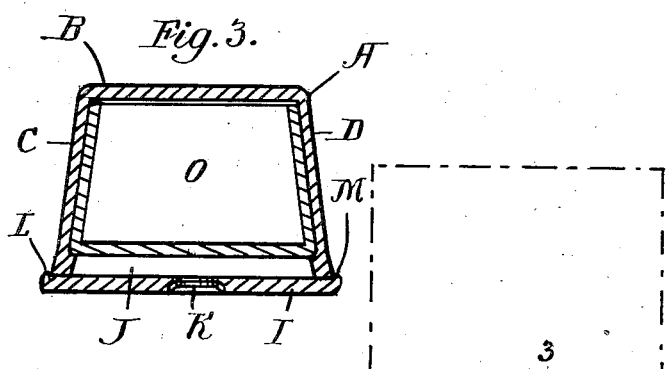
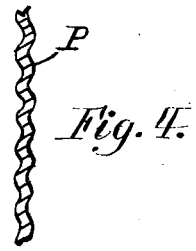
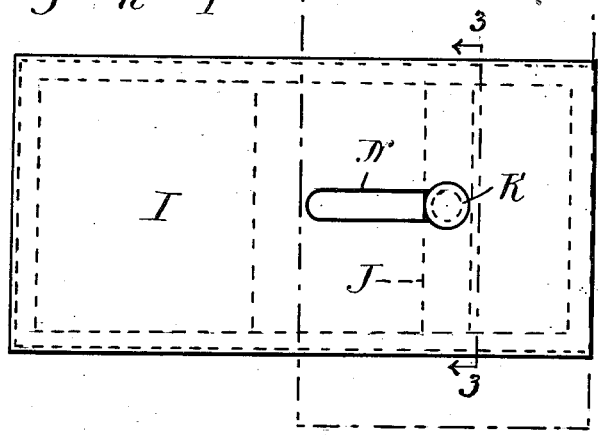
Inventor:
Charles W. Hull,
by: [signature]
Attorney.

Patented Aug. 14, 1934

1,970,172

UNITED STATES PATENT OFFICE 1,970,172

BOOSTER

Charles W. Hull, Los Angeles, Calif., assignor of one-third to Kenneth D. Fobes, South Pasadena, Calif., and one-third to Frank P. Cleary, Los Angeles, Calif.

Application June 26, 1933, Serial No. 677,739

3 Claims. (Cl. 254—88)

My invention relates to a booster of that type which is designed for elevating the wheel of a self propelled vehicle automatically by the power exerted by the vehicle so that a jack may more easily be applied below the axle housing for lifting the wheel off of the ground. With pneumatic tires now in general use and more particularly of the large size type called "balloon tires" it frequently occurs in case of deflation due to a puncture or other cause, that there is not sufficient room between the axle housing and the ground to apply and use a jack for raising the wheel to clear the deflated tire so that the latter can be removed from the wheel and repaired or replaced by another tire. Also in the event of soft ground below any type of tire the wheel frequently sinks leaving insufficient room for applying a jack. My improved booster is adapted to be placed in the path of the wheel carrying the deflated tire and the vehicle is propelled a short distance forwardly or backwardly thus causing the wheel on which the deflated tire is secured to roll upwardly and mount the booster at sufficient elevation to permit a jack being easily adjusted and the wheel elevated. The primary object of my invention is the production of a booster of the type stated which is extremely simple, strong and inexpensive in construction and highly effective in use. A further object is to provide a booster having the above and other advantages which is constructed with improved features to enable the device to be used for holding tools in compact and readily accessible condition, for carrying water or gasoline in case of emergency, and for other general utility purposes.

With these and other objects in view my invention comprises the features of construction and combination of parts hereinafter described and claimed.

In the accompanying drawing forming part of this specification, Fig. 1 is a perspective view of my invention; Fig. 2 is a bottom plan view; Fig. 3 is a section taken on line 3—3 of Fig. 2, and Fig. 4 is a section of a detail illustrating an alternative construction of my invention.

My improved booster resembles a small readily portable body shell A having a short substantially horizontal wheel supporting crown surface B, of suitable shape and area carried by a pair of downwardly diverging opposite side walls C and D to assist in producing a stability base. At the front end of the device is a short ramp E forming an upwardly inclined approaching tread surface for the periphery of a wheel to roll upon, which also is supported by and between the sides C and D. The junction between ramp E and the upper crown surface B is curved at F so that the wheel will roll from the ramp onto the crown more smoothly and reduce tendency to cut or abraid a deflated tire. The back end of the body shell is closed by an upwardly slanting wall G. These parts are preferably formed integral to increase strength and reduce cost of production. The lower edge of said sides and back end wall have an outwardly flaring skirt H to increase strength, rigidity and area of the stability base.

The base portion of the body shell A is closed by a combined closure and extension support, resembling a plate I, which is secured loosely to the body shell A by means of a cross bar J, integral with and extending across the space between the sides C and D and a pivot K extending down from the cross bar and loosely secured to said plate. The side edges of plate I are formed with a pair of slight upwardly longitudinal shoulders L and M which serve to engage the lower edges of the sides C and D and hold the plate in closed position. The looseness of the pivot connection between the body shell and plate permits the plate to be turned laterally past shoulders L and M as shown by the broken line extending position shown in Fig. 2. In this position the stability support for the device is also increased which is an advantage in soft ground. Also when extended laterally the plate may form a rest for a jack which is an advantage. The slot N in the cover plate enables the plate to be adjusted with both of its opposite ends extending on opposite sides of the body shell A for stability purposes.

The body shell may be provided with a longitudinal drawer O, which slides freely through the back end wall G and is adapted to hold tools or material as a convenience to the motorist. Also when desired the walls of the body shell and cover plate may be corrugated as shown in Fig. 4 at P, either vertically, horizontally or slanting, or roughened to increase strength of the device and reduce slipping of the tire against the body shell or of the cover plate upon the ground.

Various other modifications are contemplated and I do not wish to be understood as confining myself to the specific construction described within the spirit of my invention.

Having described my invention, what I claim as new and desire to secure by Letters Patent is:

1. A booster for vehicle wheels, consisting of a body shell having an upper tread surface forming a horizontal rest for the periphery of a wheel, a ramp approaching and merging into said tread surface and sides diverging downwardly and supporting said tread surface and ramp, and a plate forming a closure over the lower portion of said body shell, said plate being movably fastened and adapted to swing into lateral extending position to assist in supporting said shell and form a rest for an object at one side of said shell.

2. A booster for vehicle wheels consisting of a body shell having an upper laterally extending tread surface forming a rest for the periphery of a wheel, a ramp approaching said tread surface and sides supporting said tread surface and ramp, a drawer slidable through one end of said shell, and a plate forming a closure over the lower portion of said shell and pivoted to swing into closed position over the lower portion of said shell or into lateral position extending from the shell to increase the supporting surface provided by the device on the ground.

3. A booster for vehicle wheels, consisting of a body shell having a short upper tread surface forming a rest for the periphery of a wheel, a ramp approaching and merging into said tread surface and sides supporting said tread surface and ramp, and a plate forming a closure over the lower portion of said body shell, said plate being movably fastened and adapted to swing into lateral extending position to assist in supporting said shell.

CHARLES W. HULL.